United States Patent
Federowicz

(10) Patent No.: US 10,220,538 B2
(45) Date of Patent: Mar. 5, 2019

(54) EGG DECAPPING APPARATUS, AND ASSOCIATED METHOD

(71) Applicant: Zoetis Services LLC, Florham Park, NJ (US)

(72) Inventor: Joseph Federowicz, Apex, NC (US)

(73) Assignee: Zoetis Services LLC, Parsippany, NJ (US)

( * ) Notice: Subject to any disclaimer, the term of this patent is extended or adjusted under 35 U.S.C. 154(b) by 515 days.

(21) Appl. No.: 14/852,671

(22) Filed: Sep. 14, 2015

(65) Prior Publication Data

US 2016/0075046 A1 Mar. 17, 2016

Related U.S. Application Data

(60) Provisional application No. 62/050,238, filed on Sep. 15, 2014.

(51) Int. Cl.
*B26D 7/08* (2006.01)
*B26D 3/24* (2006.01)
(Continued)

(52) U.S. Cl.
CPC ............ *B26D 7/088* (2013.01); *A47J 43/145* (2013.01); *B26D 1/04* (2013.01); *B26D 3/24* (2013.01); *B26D 7/18* (2013.01)

(58) Field of Classification Search
CPC .......... B26D 7/00; B26D 7/18; B26D 7/1818; B26D 7/08; B26D 7/088; A47J 43/14; A47J 43/145
See application file for complete search history.

(56) References Cited

U.S. PATENT DOCUMENTS

| | | | |
|---|---|---|---|
| 2,391,169 A | 12/1945 | Koch | |
| 2,465,176 A * | 3/1949 | Serbu | A47J 43/145 |
| | | | 99/498 |

(Continued)

FOREIGN PATENT DOCUMENTS

| | | |
|---|---|---|
| AU | 518332 | 9/1981 |
| BE | 901270 A1 | 3/1985 |

(Continued)

OTHER PUBLICATIONS

PCT International Search Report and Written Opinion, International Filing Date Sep. 14, 2015; International Application No. PCT/US2015/049901.

*Primary Examiner* — Jason Daniel Prone
*Assistant Examiner* — Richard D Crosby, Jr.
(74) *Attorney, Agent, or Firm* — Scott C. Mayhew

(57) ABSTRACT

An egg decapping apparatus is provided. Such an apparatus includes a reference plate defining a plurality of reference openings therethrough. Each reference opening is adapted to receive an avian egg therein from a lower side of the reference plate and to stop further upward movement of the avian egg within the reference opening when an upper egg section to be cut extends from the reference opening above the reference plate. A cutter member is positioned above the reference plate. The cutter member is moveable across the reference plate and the reference openings from a precut position to a post cut position for creating an opening in the upper egg section. A cleaning member is moveable with the cutter member across the reference plate. The cleaning member is actuatable at the post cut position so as to remove debris from the upper egg section accumulated on the cutter member. Associated methods are also provided.

5 Claims, 6 Drawing Sheets

(51) Int. Cl.
    *B26D 7/18*   (2006.01)
    *B26D 1/04*   (2006.01)
    *A47J 43/14*  (2006.01)

(56) References Cited

U.S. PATENT DOCUMENTS

| | | | | |
|---|---|---|---|---|
| 2,524,844 | A * | 10/1950 | Smith | A47J 43/145 |
| | | | | 83/790 |
| 2,962,067 | A | 11/1960 | Mesojedec | |
| 3,090,413 | A | 5/1963 | Rossi | |
| 3,307,600 | A | 3/1967 | Fuge | |
| 3,420,743 | A | 1/1969 | Sandhage et al. | |
| 3,470,925 | A | 10/1969 | Noren | |
| 3,486,982 | A | 12/1969 | Noren | |
| 3,958,505 | A * | 5/1976 | Baker | A47J 43/145 |
| | | | | 99/495 |
| 3,973,482 | A | 8/1976 | Khee | |
| 4,605,562 | A * | 8/1986 | Fujimura | A47J 43/14 |
| | | | | 426/299 |
| 4,961,946 | A * | 10/1990 | Shimizu | A23J 1/08 |
| | | | | 426/299 |
| 5,054,384 | A * | 10/1991 | Smith, Jr. | A47J 37/044 |
| | | | | 99/335 |
| 5,069,119 | A * | 12/1991 | Idowu | A23J 1/09 |
| | | | | 99/498 |
| 5,085,139 | A * | 2/1992 | Pellegrinelli | A47J 43/145 |
| | | | | 99/497 |
| 5,092,232 | A * | 3/1992 | Bergmeier | A47G 19/28 |
| | | | | 99/568 |
| 5,197,380 | A * | 3/1993 | Fisher | A47J 43/145 |
| | | | | 99/496 |
| 5,325,768 | A * | 7/1994 | van den Hazel | A47J 43/145 |
| | | | | 99/497 |
| 5,628,246 | A * | 5/1997 | Kristensen | A23J 1/09 |
| | | | | 99/497 |
| 6,053,335 | A | 4/2000 | Rutter | |
| 6,095,038 | A * | 8/2000 | Cerro | A47J 43/14 |
| | | | | 99/497 |
| 8,011,294 | B2 * | 9/2011 | Cantineau | A61K 39/145 |
| | | | | 99/496 |
| 8,196,509 | B2 * | 6/2012 | Bergmeier | A47J 43/14 |
| | | | | 198/418 |
| 8,739,695 | B2 * | 6/2014 | Kristensen | A47J 43/145 |
| | | | | 198/433 |
| 9,370,778 | B2 * | 6/2016 | Snyder | B02C 19/005 |
| 2004/0121056 | A1 | 6/2004 | Rombaut et al. | |
| 2009/0053803 | A1 | 2/2009 | Cantineau | |
| 2012/0148714 | A1 * | 6/2012 | Holst | A47J 43/145 |
| | | | | 426/298 |
| 2015/0208869 | A1 * | 7/2015 | Gomez-Gurza | A47J 43/145 |
| | | | | 99/568 |
| 2016/0075046 | A1 * | 3/2016 | Federowicz | B26D 7/088 |
| | | | | 83/23 |

FOREIGN PATENT DOCUMENTS

| | | |
|---|---|---|
| BE | 903406 A1 | 2/1986 |
| CH | 307617 | 6/1955 |
| CH | 672720 | 12/1989 |
| DE | 418655 | 9/1925 |
| DE | 1978332 U | 2/1968 |
| DE | 2106328 A1 | 12/1972 |
| DE | 7334247 U | 1/1974 |
| DE | 2614567 A1 | 10/1977 |
| DE | 3519180 A1 | 12/1986 |
| DE | 3639302 A1 | 5/1988 |
| DE | 9006018 U1 | 8/1990 |
| DE | 4034659 A1 | 5/1992 |
| DE | 4446738 A1 | 6/1996 |
| DE | 202006004773 U1 | 6/2006 |
| EP | 1362509 A1 | 11/2003 |
| GB | 189915341 | 8/1899 |
| GB | 189905714 | 4/1900 |
| GB | 190300285 | 11/1903 |
| GB | 190507233 | 7/1905 |
| GB | 191310184 | 1/1914 |
| GB | 201487 | 8/1923 |
| GB | 203134 | 9/1923 |
| GB | 310271 | 4/1929 |
| GB | 747684 | 4/1956 |
| GB | 853840 | 11/1960 |
| GB | 1400835 | 7/1975 |
| GB | 1528706 | 10/1978 |
| GB | 2024609 | 1/1980 |
| NL | 8401610 | 12/1985 |
| RU | 2045897 C1 | 10/1995 |
| SU | 1784146 A1 | 12/1992 |

\* cited by examiner

EGG DECAPPING APPARATUS, AND ASSOCIATED METHOD

CROSS REFERENCE TO RELATED APPLICATION

This application claims the benefit of U.S. Provisional Patent Application No. 62/050,238, filed Sep. 15, 2014, which is expressly incorporated herein by reference in its entirety.

TECHNICAL FIELD

The present disclosure generally relates to egg processing devices and systems. More particularly, the present disclosure relates to an apparatus for opening avian eggs, and an associated method.

BACKGROUND

Avian eggs may be used in the production of biologics such as viruses for vaccines, wherein such biologics must be harvested from the eggs at the appropriate time. One method of producing biologics is to use fertilized avian eggs. The desired biologics are grown within the egg and must be harvested therefrom for further processing. One method of producing vaccines, such as influenza vaccines, is to use fertilized avian (chicken) eggs. The eggs are injected with the viruses and, after a sufficient time of incubation to allow the virus to multiply, the eggs are opened to harvest the viruses. Harvesting typically involves the collection of the allantoic fluid contained in the allantoic sac of a fertilized egg. The viruses are then separated from the fluid, purified, and inactivated to produce the final vaccine product.

In order to harvest the desired biologics within the egg, the egg shell must be opened. In some instances, a blade implemented on an automated decapping system may cut the top section or "egg cap" of the egg to provide access to the allantoic fluid within. Thereafter, various means can be utilized to remove the allantoic fluid for further processing. Such conventional automated decapping systems, however, typically produce debris-filled working environments in which egg fluids and egg cap shell debris and artifacts inundate the system due to the mass quantity of eggs decapped thereby during a harvesting production run.

Accordingly, it would be desirable to provide an egg decapping system capable of reducing or otherwise minimizing egg cap debris and artifacts that linger about the egg decapping system after a decapping process is completed on a grouping of avian eggs. Furthermore, it would be desirable to provide an associated method to facilitate decapping of avian eggs in a manner that reduces build-up of egg cap debris and artifacts in an egg decapping system.

BRIEF SUMMARY

The above and other needs are met by aspects of the present disclosure which, according to one aspect, provides an egg decapping apparatus having a reference plate defining a plurality of reference openings therethrough. Each reference opening is adapted to receive an avian egg therein from a lower side of the reference plate and to stop further upward movement of the avian egg within the reference opening when an upper egg section to be cut extends from the reference opening above the reference plate. A cutter member is positioned above the reference plate. The cutter member is moveable across the reference plate and the reference openings from a precut position to a post cut position for creating an opening in the upper egg section. A cleaning member is moveable with the cutter member across the reference plate. The cleaning member is actuatable at the post cut position so as to remove debris from the upper egg section accumulated on the cutter member.

Another aspect provides a method of opening an avian egg. The method comprises providing a plurality of avian eggs to an egg decapping apparatus, and positioning the avian eggs beneath a reference plate of the egg decapping apparatus, the reference plate defining a plurality of reference openings therethrough. The method further comprises lifting the avian eggs to the reference plate such that each reference opening receives an avian egg therein from a lower side of the reference plate such that an upper egg section of the avian egg extends from the reference opening above the reference plate. The method further comprises actuating a decapping device to move across the reference plate from a precut position to a post cut position, the decapping device having a cutter member and a cleaning member, wherein the cutter member moves across the reference plate and the reference openings from a precut position to a post cut position so as to create an opening in the upper egg section. The method further comprises actuating the cleaning member at the post cut position to remove debris from the upper egg section accumulated on the cutter member.

Yet another aspect provides a method of assembling a decapping apparatus. The method comprises providing a frame, and positioning an egg lift assembly on the frame, the egg lift assembly being configured to lift eggs from an egg carrier. The method further comprises positioning a reference plate on the frame and above the egg lift assembly, the reference plate defining a plurality of reference openings therethrough, wherein each reference opening is adapted to receive an avian egg therein from a lower side of the reference plate such that an upper egg section of the avian egg extends from the reference opening above the reference plate. The method further comprises positioning a decapping device on the frame and above the reference plate, wherein the decapping device has a cutter member and a cleaning member. The cutter member is moveable across the reference plate and the reference openings from a precut position to a post cut position to create an opening in the upper egg section. The cleaning member is moveable with the cutter member across the reference plate, and the cleaning member is actuatable at the post cut position so as to remove debris from the upper egg section accumulated on the cutter member.

Thus, various aspects of the present disclosure provide advantages, as otherwise detailed herein.

BRIEF DESCRIPTION OF THE DRAWINGS

Figure 1:
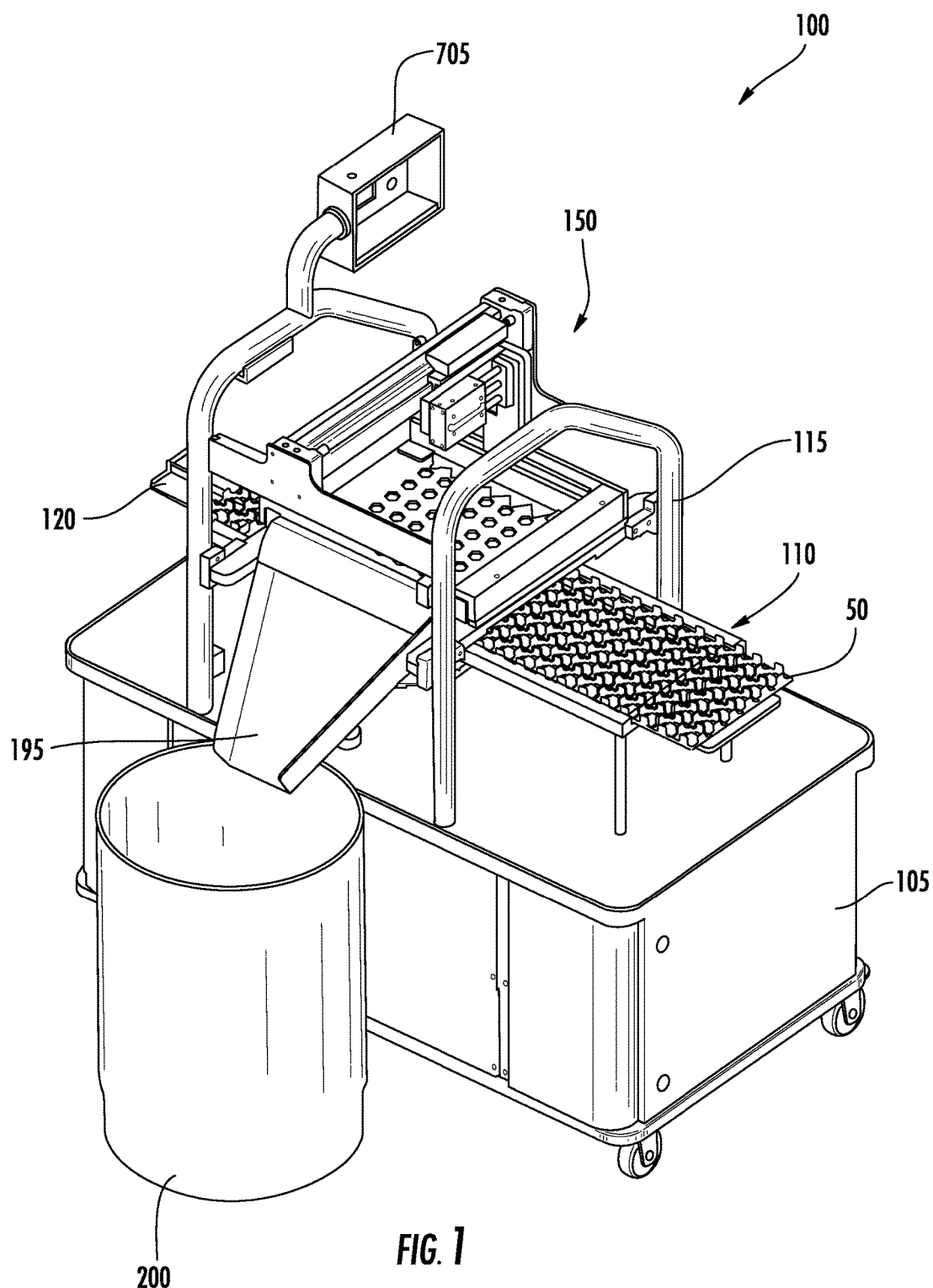
Figure 2:
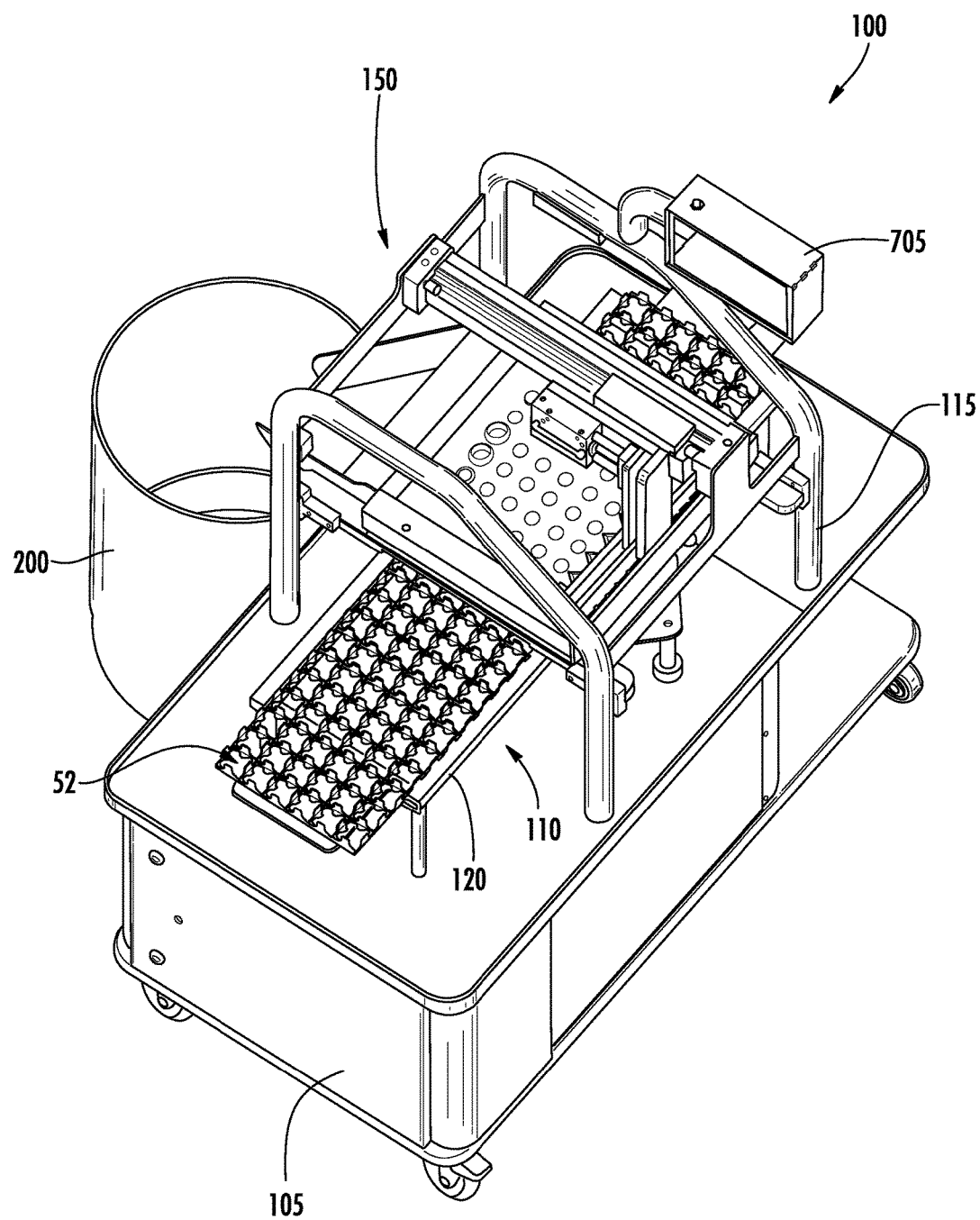
Figure 3:
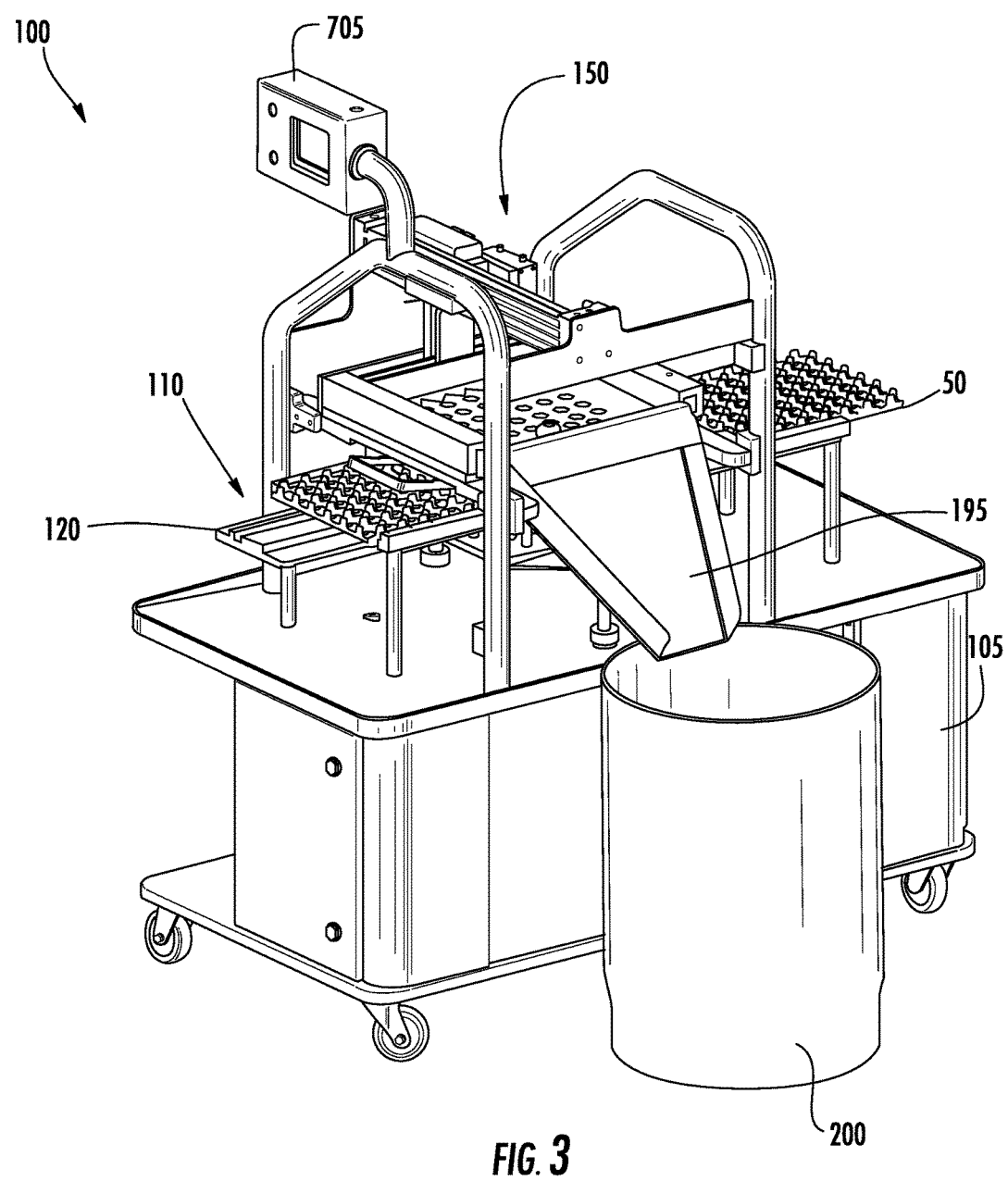
Figure 4:
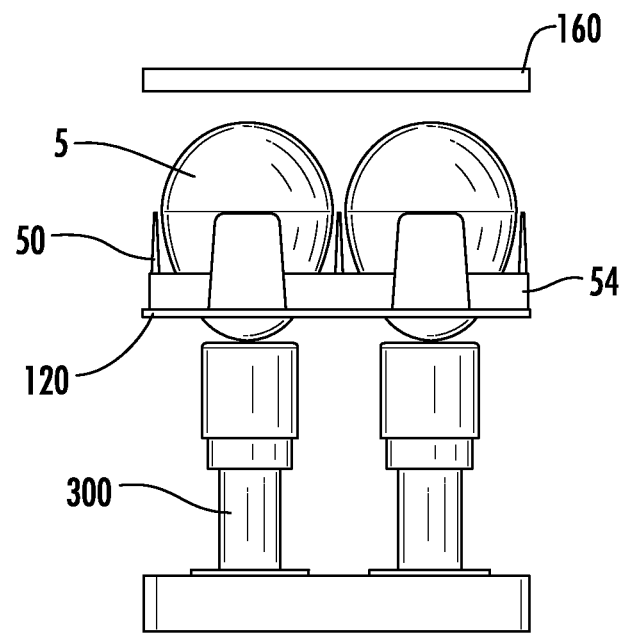
Figure 5:
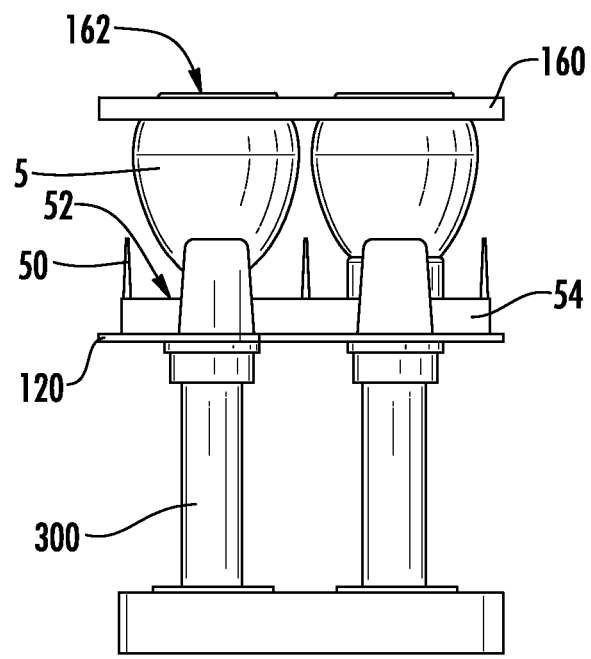
Figure 6:
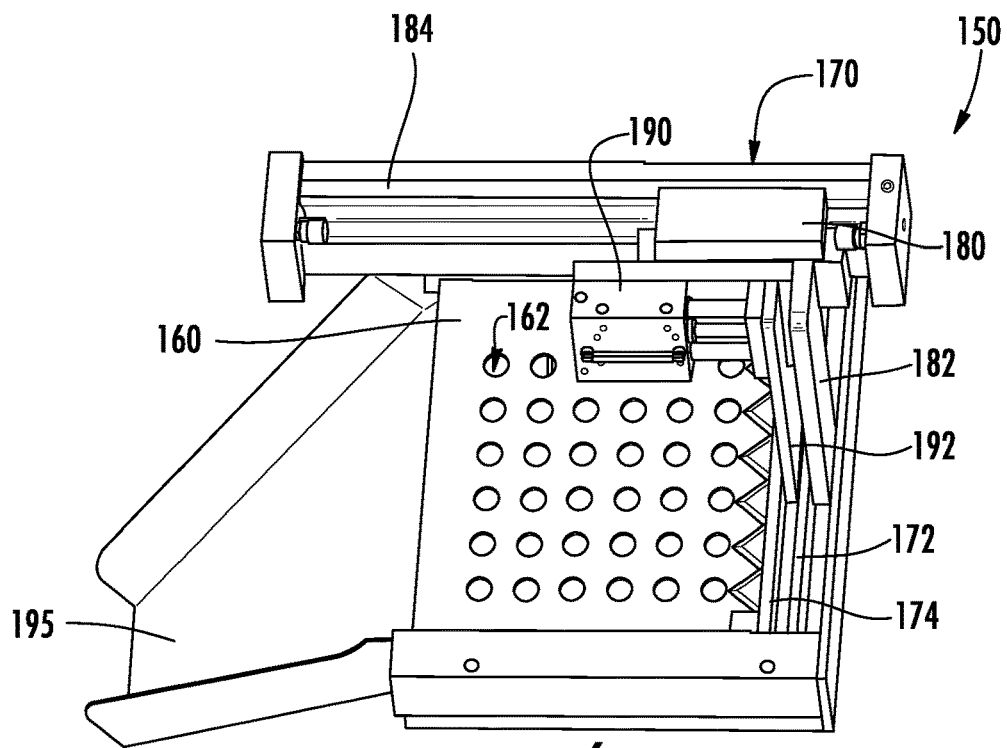
Figure 7:
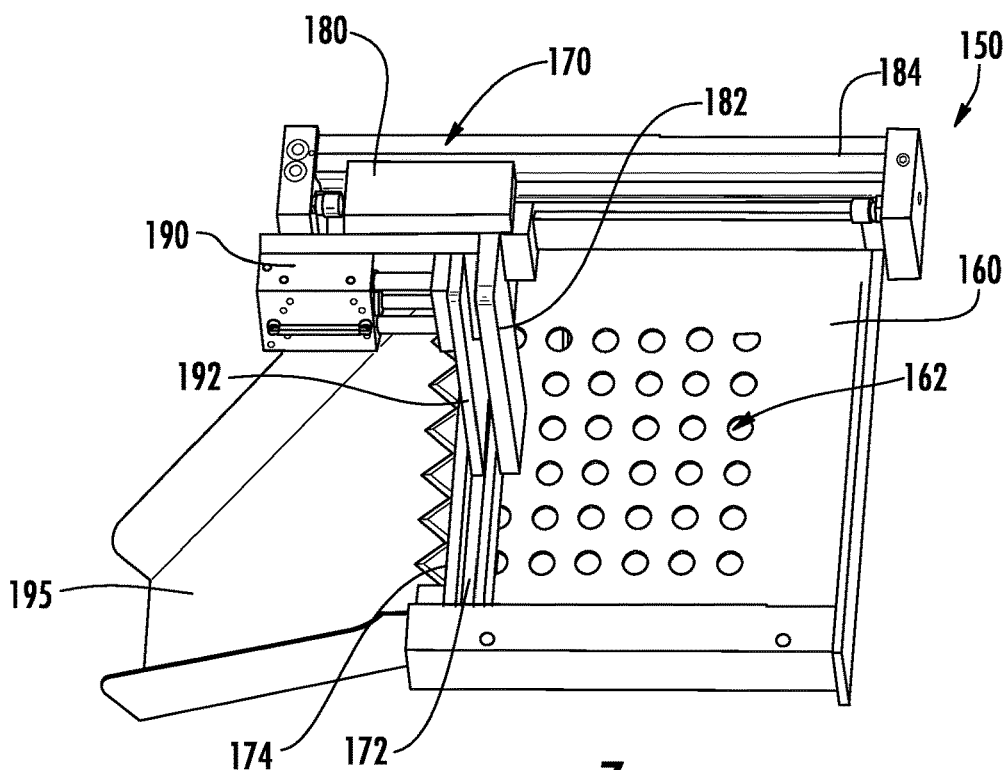
Figure 8:
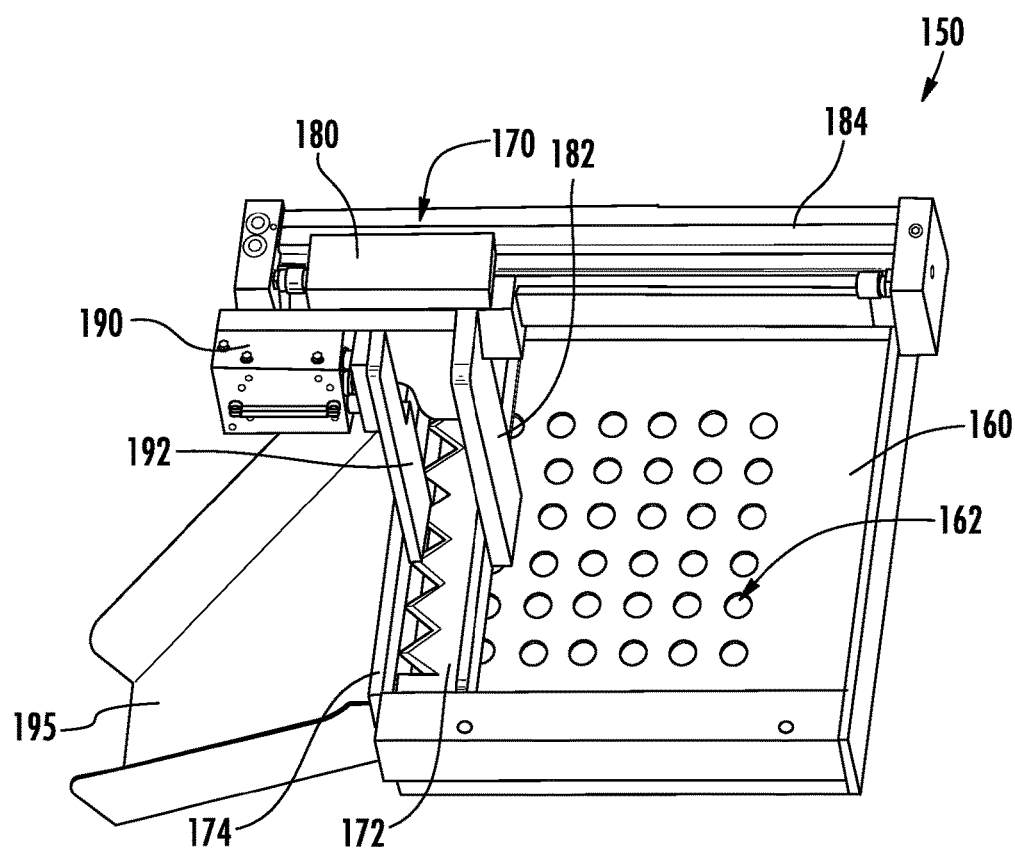

Having thus described various embodiments of the present disclosure in general terms, reference will now be made to the accompanying drawings, which are not necessarily drawn to scale, and wherein:

FIG. 1 is a front right side perspective view of an egg decapping apparatus according to one aspect of the present disclosure;

FIG. 2 is a rear perspective view of the egg decapping apparatus of FIG. 1;

FIG. 3 is a front left side perspective view of the egg decapping apparatus of FIG. 1;

FIG. 4 is a sectional side view of a lift assembly for lifting eggs to a reference plate, illustrating a plurality of eggs seated within an egg flat, according to one aspect of the present disclosure;

FIG. 5 is a sectional side view of the lift assembly of FIG. 4, illustrating a plurality of eggs lifted to the reference plate;

FIG. 6 is a perspective view of a decapping assembly for use in a decapping apparatus, illustrating a decapping device at a precut position, according to one aspect of the present disclosure;

FIG. 7 is a perspective view of a decapping assembly for use in a decapping apparatus, illustrating a decapping device at a post cut position, according to one aspect of the present disclosure; and FIG. 8 is a perspective view of a decapping assembly for use in a decapping apparatus, illustrating a cleaning member at an actuated position, according to one aspect of the present disclosure.

DETAILED DESCRIPTION OF THE DISCLOSURE

Various aspects of the present disclosure now will be described more fully hereinafter with reference to the accompanying drawings, in which some, but not all aspects of the disclosure are shown. Indeed, this disclosure may be embodied in many different forms and should not be construed as limited to the aspects set forth herein; rather, these aspects are provided so that this disclosure will satisfy applicable legal requirements. Like numbers refer to like elements throughout.

The apparatuses and methods of the present disclosure will now be described with reference to the figures. With initial reference to FIGS. 1-3, illustrated in the figures is an exemplary apparatus 100 for decapping or otherwise removing an end section of an egg as part of a process for harvesting allantoic fluid from embryonated chicken eggs. In some instances, a conveyor 110 may be provided such that multiple eggs can be received within the apparatus 100. An operator may manually loads trays 50 (so-called "flats") of eggs into the apparatus 100. Each tray 50 of eggs may then be moved through the apparatus 100 for processing at a decapping unit 150, wherein an opening may be created in the top portion of the egg shells (also referred to as "caps"). The egg caps may be cut and removed to create the opening in the eggs. The debris created by the opening process, e.g., the cut caps, is then discarded via a debris removal system.

As mentioned previously, the eggs may be carried through the apparatus 100 on trays 50. Each tray 50 may be capable of holding a predetermined number of eggs in a matrix of individual egg support sections. Each egg support section may include an opening 52 in which the bottom of the egg rests against egg support edges 54 (FIG. 4), the opening 52 allowing an egg lifting device 300 (FIGS. 4 and 5) to pass through the opening 52 as explained in more detail below.

With further reference to FIGS. 1-3, trays 50 with eggs may be manually loaded onto a rail assembly 120 and onto the conveyor 110. The trays 50 may be placed onto the conveyor 110 so as to create a continuous feed of trays 50. Any suitable tray loading means, manual or automated, and any suitable tray conveyor means may be used. Tray stops may be used to hold and release the trays 50 along the conveyor 110 to control the position of the trays 50 in the apparatus 100. Additional tray stops may be provided as needed to control the flow of trays 50 into and through the apparatus 100, and that each can be independently controlled with use of a sensor to track the position of a tray 50.

The apparatus 100 may include a cart 105 having a frame 115 extending therefrom for supporting the decapping unit 150. The conveyor 110 may be configured to transport the trays 50 beneath the decapping unit 150.

As seen in FIGS. 4 and 5, the trays 50 move along the conveyor 110 to the decapping unit 150 where the eggs may be raised out of the trays 50 for de-capping. The decapping unit 150 may cut the caps of the eggs lifted from the tray 50. The cut egg caps may then be discarded via a debris removal system and the eggs lowered back into the trays 50 for further processing. With further reference to FIGS. 4 and 5, which show the location of the tray 50 underneath the decapping unit 150, it is seen that the eggs 5 may be lifted from the tray 50 for cutting using the egg lifting device 300. The eggs 5 may be cut and then lowered back into the tray 50 for further processing.

With reference to FIGS. 6-8, the decapping unit 150 is now described. The decapping unit 150 may generally include a reference plate 160 and a decapping device 170. The reference plate 160 may be configured to remain stationary. The decapping device 170 may combine a decapping assembly and a debris removal assembly into a single functioning unit. In this regard, the decapping device 170 may include a cutter member 172 and a cleaning member 174 that are movable together across the reference plate 160 from a precut position to a post cut position.

To control where the cut is made on any given egg 5, each egg is referenced, wherein the section of the egg 5 to be cut (or "decapped") is fixed. As shown in FIGS. 6-8, the referencing of each egg 5 may be carried out with a circular reference opening 162 formed in the reference plate 160. As shown in FIG. 4, an egg 5 may be lifted upwardly from the underside of the tray 50 into the reference opening 162 until the egg 5 contacts the opening 162, the opening 162 acting as a stop, wherein the cap of the egg 5 to be cut extends upwardly from the reference opening 162 for cutting. The reference plate 160 may be made of any suitable material for pharmaceutical use, such as stainless steel.

The cutter member 172 may be positioned directly above the reference plate 160 for cutting the eggs 5. In some instances, the decapping unit 150 may include a single cutter member 172 extending across the reference plate so as to be capable of passing over each of the reference openings 162. The cutter member 172 may be made from a stainless steel material suitable for pharmaceutical use. The cutter member 172 may include a blade formed of a sharp edge. In some instances, the blade may be serrated.

During the egg cutting process, the cutter member 172 moves across the reference plate 160, from a precut position to a post cut position, to cut the eggs. This motion carries the cutter member 172 across the reference openings 162 and then back again to the precut position.

A first actuator 180, which attaches to an actuating arm 182, moves the decapping device 170 (and thus the cutter member 172) back and forth between the precut and post cut positions. The motion and stroke of the decapping device 170 may be controlled by the first actuator 180.

In some instances, a single cleaning member 174 may be positioned above the reference plate 160 and the cutter member 172, while being controlled by a second actuator 190. In this regard, actuation of the cleaning member 174 may cause debris created by the cutting process, in the form of debris removal caps, to be directed into a debris chute 195. The motion and stroke of the cleaning member 174 may be controlled by the second actuator 190. The cleaning member 174 may be a wiper blade attached to a cleaning arm 192 operably engaged with the second actuator 190. In some instances, the cleaning member 174 may be formed of a rubber material, such as, for example, a synthetic rubber (e.g., polychloroprene).

The movement of the decapping device 170 relative to the reference plate 160 for decapping the eggs 5 is now described with reference to FIGS. 6-8. Once the eggs 5 have been lifted from the tray 50 using the lifting device 300 and into the openings 162 of the reference plate 160, the decapping device 170 is positioned in the precut position (FIG. 6) such that the cutter member 172 is positioned at one end of the reference plate 160 so that the cutter member 172 is not covering any of the reference openings 162 of the reference plate 160. It is further seen that in the precut position the cleaning member 174 may also be positioned proximate to the cutter member 172. The reference plate 160 remains stationary while the cutter member 172 and cleaning member 174 move together across the reference plate 160 to carry out the decapping process.

In a first movement, the first actuator 180 moves the decapping device 170 along an actuator track 184 in a direction across the reference plate 160, moving the cutter member 172 through the eggs 5 to a post cut position proximate to the debris chute 195. At the post cut position (FIG. 7), the cut egg sections detached from the eggs may either have been directed onto the debris chute 195 or remain on top of the cutter member 172. That is, the movement of the cutter member 172 across the reference plate 160 may have provided enough force to displace the egg caps from the reference plate 160 and onto the debris chute 195. Otherwise, the egg caps may have been carried by the cutter member 172 to the post cut position, where said detached egg caps remain on the cutter member 172, whereby removal of such remaining egg caps on the cutter member 172 is needed.

In a second movement, with reference to FIG. 8, the second actuator 190 may actuate the cleaning member 174 to move to a deployed position (FIG. 8) such that the cleaning member 174 then pushes the debris removal caps present on the cutter member 172 onto the debris chute 195. In this regard, the cleaning member 174 may be perpendicularly arranged with respect to the cutter member 172 such that a leading edge of the cleaning member 174 engages and moves across the cutter member 172 during a cleaning procedure. At the completion of this second movement, the detached egg caps have been directed onto the debris chute 195. In some instances, a waste container 200 may be positioned beneath the debris chute 195 to receive the decapped egg sections.

In a third movement, the first actuator 180 may move the decapping device 170 back to the precut position. After clearing the debris from the cutter member 172, the cleaning member 174 may be returned by the second actuator 190 to a non-deployed position (FIGS. 6 and 7) when the decapping device 170 is positioned at the post cut position or after the decapping device 170 returns to the precut position. While the present disclosure has the above described sequence of movements, it is understood that this sequence may be modified or altered as suitable for other aspects of the disclosure.

The actuators 180 and 190 can be of any suitable type mechanism. For example, the actuators may be an air cylinder type actuator, among others.

Sensors, controllers, and other electronics as known in the art can be used to control the movements and processes of the apparatus 100. For example, a controller 705 may be in communication with the first actuator 180 and the second actuator 190 for controlling actuation thereof.

Many modifications and other aspects of the present disclosure set forth herein will come to mind to one skilled in the art to which this disclosure pertains having the benefit of the teachings presented in the foregoing descriptions and the associated drawings. Therefore, it is to be understood that the present disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. An egg decapping apparatus, comprising:
    a reference plate defining a plurality of reference openings therethrough, each reference opening being adapted for receiving an avian egg therein from a lower side of the reference plate and for stopping further upward movement of the avian egg within the reference opening when an upper egg section to be cut extends from the reference opening above the reference plate;
    a cutter member positioned above the reference plate, the cutter member being moveable across the reference plate and the reference openings from a precut position to a post cut position so as to create an opening in the upper egg section; and
    a cleaning member moveable with the cutter member across the reference plate, the cleaning member being actuatable at the post cut position so as to remove debris from the upper egg section accumulated on the cutter member, wherein the cleaning member and the cutter member move together across the reference plate.

2. An egg decapping apparatus according to claim 1, further comprising a first actuator device configured to move the cutter member and the cleaning member across the reference plate from the precut position to the post cut position.

3. An egg decapping apparatus according to claim 2, further comprising a second actuator device configured to move the cleaning member across the cutter member at the post cut position so as to remove accumulated debris therefrom.

4. An egg decapping apparatus according to claim 1, further comprising a debris chute disposed adjacent to the reference plate, the debris chute being configured to receive the upper egg section debris removed by the cutter member.

5. An egg decapping apparatus according to claim 1, wherein the cleaning member comprises a wiper blade positioned perpendicular to the cutter member.

* * * * *